United States Patent
Toshima et al.

[11] Patent Number: 5,903,391
[45] Date of Patent: May 11, 1999

[54] OPTICAL FILM

[75] Inventors: Yasumaro Toshima, Yono; Takaaki Kato, Ina-machi, both of Japan

[73] Assignee: Kimoto Co., Ltd., Tokyo, Japan

[21] Appl. No.: 08/824,972

[22] Filed: Mar. 27, 1997

[30] Foreign Application Priority Data

Mar. 27, 1996 [JP] Japan ................................ 8-072554

[51] Int. Cl.⁶ .............................. G02B 21/60; G02F 1/13; H01J 5/16
[52] U.S. Cl. ......................... 359/599; 359/883; 359/884; 359/531; 359/529; 359/530; 359/613; 359/614
[58] Field of Search ..................... 359/599, 883, 359/884, 531, 529, 530, 613, 614

[56] References Cited

U.S. PATENT DOCUMENTS

| | | | |
|---|---|---|---|
| 4,448,491 | 5/1984 | Okubo | 359/155 |
| 5,417,515 | 5/1995 | Hachey et al. | 359/531 |
| 5,563,738 | 10/1996 | Vance | 359/613 |
| 5,627,426 | 5/1997 | Whitman et al. | 359/599 |
| 5,728,645 | 3/1998 | Oshima et al. | 503/204 |

FOREIGN PATENT DOCUMENTS

| | | |
|---|---|---|
| 5-73602 | 10/1993 | Japan . |
| 6-59107 | 3/1994 | Japan . |
| 6-59108 | 3/1994 | Japan . |
| 3010871 | 3/1995 | Japan . |

*Primary Examiner*—Cassandra Spyrou
*Assistant Examiner*—Mohammad Y. Sikder
*Attorney, Agent, or Firm*—Burns, Doane, Swecker & Mathis, L.L.P.

[57] ABSTRACT

An optical film having high light transmittance and excellent light diffusibility is provided. The optical film comprises a transparent substrate 1 and a light diffusion layer 2 formed on one or both sides of the substrate 1. As the resin 3 of the light diffusion layer 2, an ionizing radiation curable resin is used in an amount of, preferably, not less than 50% of the resin and a small amount of the light diffusive agent is dispersed therein. The optical film exhibits excellent light diffusion effect even though the content of the light diffusive agent is small and also exhibits high light transmittance because of the small content of the light diffusive agent. Accordingly, this optical film is suitable for applications such as a color liquid crystal display which is required to have a sufficient brightness, and in combination with another optical material such as a prism lens.

5 Claims, 2 Drawing Sheets

OPTICAL FILM

BACKGROUND OF THE INVENTION

1. Field of the Invention

The present invention relates to an optical film having diffusibility. In particular, it relates to an optical film utilized as a diffusive sheet for a subsurface illuminator of a liquid crystal display.

2. Prior Art

The light source shown in FIG. 4 has been used as a surface light source for a subsurface illuminator of a lap-top type or note-type personal computer, a word-processor, a monochrome or colored liquid crystal display or the like.

In this light source, called an edge-light type light source, incident light from a tubular light source 30 is introduced to the side of a light conducting plate 20 having a light scattering pattern and illuminates the light conducting plate in accord with the pattern. A light diffusion sheet 10 is placed on the light emitting surface of the light conducting plate to hide the pattern.

The light diffusion sheet 10 is required to have good light transmittance, to hide the light scattering pattern of the light conducting plate, to have a good color rendering effect and the like. As the light diffusion sheet, there is known a plate formed by dispersing an inorganic or organic light diffusive agent in a resin such as methacrylic resin, polycarbonate resin, polyvinyl chloride resin or the like, or a thin film of polyester or the like to which a transparent resin solution including a light diffusive agent is applied.

Further, some color liquid crystal displays, which require a high degree of brightness, are provided with a light source equipped with a combination of the light diffusion sheet and a prism lens which directs as much of the light emitted from the light conducting plate as possible in the front direction. The light diffusion sheet of such a surface light source is required to have high light transmittance because the prism lens and the light diffusion sheet are stacked on the light emitting surface of the light conducting plate. However, the light diffusion sheet dispersed with a light diffusive agent contains approximately 150% by weight of the light diffusive agent based on the 100% by weight of the resin component and does not have high transmittance.

Therefore, as a light diffusion sheet for use in applications requiring high transmittance, one consisting of a resin having high transmittance such as polycarbonate and made light diffusive by surface embossing is adapted.

However, a metal embossing roller is necessary for producing the light diffusion sheet, which raises the manufacturing cost. Further, once a specific metallic roller has been fabricated, the roughness of the embossing can not be adjusted easily. In order to prepare light diffusion sheets having various kinds of light diffusibility, therefore expensive metal rollers corresponding to the required diffusibilities must be prepared. In addition, the surface of a high-transmittance resin, e.g., polycarbonate, generally exhibits troublesome glare.

An object of the present invention is therefore to provide an optical film which has high light transmittance and excellent light diffusibility. Another object of the present invention is to provide an optical film which exhibits desired light diffusibility by addition of a small amount of a light diffusive agent. Another object of the present invention is to provide an optical film which can be prepared easily and at a low cost.

SUMMARY OF THE INVENTION

To achieve these objects, the inventors conducted studies on combinations of resin and light diffusive agent and appropriate measures for achieving light diffusibility. As a result, the following was found: Distinctness of image (image clarity) is a more accurate measure of the light diffusibility than haze value, the conventional measure for the light diffusibility. This is because haze value increases with decreasing transmittance so that among materials exhibitting the same diffusibility one with lower transmittance exhibits higher haze value. In contrast, distinctness of image was found to be the best measure for a material requiring both high light transmittance and good light diffusibility. As a result of their study on combinations of resin and light diffusive agent using this measure to obtain an optical film excellent in both light transmittance and light diffusibility, the inventors found that "undulation" (waving) is observed in the surface of a layer of ionizing radiation cured resin containing pigments besides unevenness caused by the pigments and that even a very small amount of the pigments can produce roughness similar to that caused by embossing and improve light diffusibility.

The optical film of the present invention comprises a transparent substrate and a light diffusion layer formed on at least one side of the substrate, wherein the light diffusion layer comprises an ionizing radiation cured resin as a binder and a light diffusion agent dispersed in the binder.

The light diffusive agent causes "undulation" on the surface of the binder and increases the light diffusibility owing to a part thereof protruding from the surface of the light diffusion layer by more than the difference between the refractive indices of the light diffusive agent and the binder, as in the case of a conventional light diffusive agent (beads). Therefore, the kind of material of the light diffusive agent is not particularly limited but it is preferred that at least a part of the light diffusive agent protrude from the surface of the light diffusion layer. As a result, only a small amount of the light diffusive agent can improve the light diffusibility and, therefore, enhance the light transmittance.

DESCRIPTION OF THE PREFERRED EMBODIMENT OF THE PRESENT INVENTION

The present invention will be explained in more detail hereinafter.

As the substrate of the optical film of the present invention, a substantially transparent film such as a plastic film, glass or the like can be employed. As the plastic film, a film of polyethylene terephthalate, polybutylene terephthalate, polycarbonate, polypropylene, polyethylene, acetylcellulose, vinyl chloride resin or the like maybe employed. A biaxially oriented film is preferable. Further, the surface on which the light diffusion layer is formed is preferably processed for easy adhesion.

The thickness of the substrate is not particularly limited but when the optical film of the present invention is used as a light diffusion sheet, it may be about 50 to 200 μm.

The light diffusion layer comprises a binder and a light diffusive agent dispersed in the binder. As the binder, resins including an ionizing radiation cured resin is used. The ionizing radiation cured resin is formed by curing an ionizing radiation curable paint including photopolymerizing prepolymers, photopolymerizing monomers and a phtopolymerization initiator by electron beam radiation or ultra-violet beam radiation.

Figure 1A:
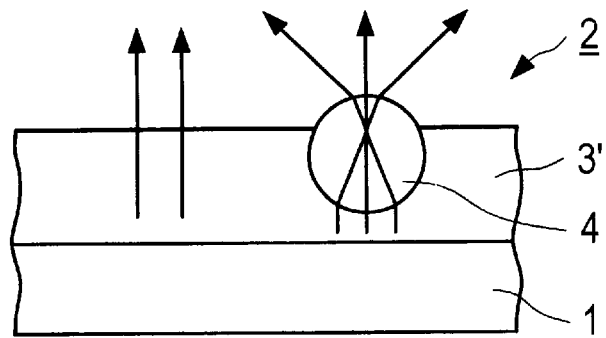
FIG. 1(a) shows a cross-sectional view of a conventional optical film and FIG. 1(b) show a cross-sectional view of an optical film according to one embodiment of the present invention, where the numeral 1 represents a substrate, the numeral 2 represents light diffusion layer, the numeral 3 represents resin and the numeral 4 represents light diffusive agent.
Figure 1B:
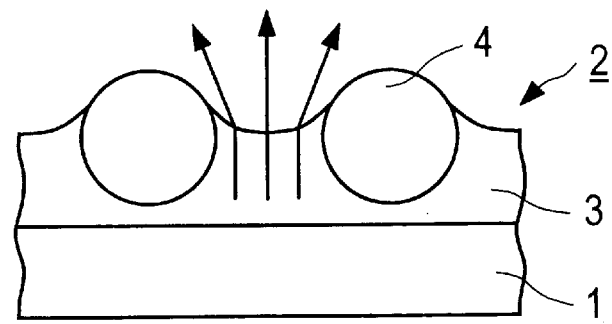

As shown in FIG. 1(a), when particles of a light diffusive agent are dispersed in thermoplastic or thermosetting resin as a light diffusion layer, light transmitted through the light diffusion layer 2 in the same direction emerges from the flat surface of the light diffusion layer 2 uniformly whereas the light emerges in various directions when it encounters a particle of the light diffusion agent 4 protruding from the surface of the resin 3'. A light diffusion effect can therfore be obtained. In this case, the greater the number of particles of the light diffusion agent, the higher the light diffusibility is. On the other hand, as shown in FIG. 1(b), when an ionizing radiation curable resin 3 is used as the resin of the light diffusion layer, "undulation" (wave-like roughness) occurs around the particles of the light diffusive agent and this undulation increases the light diffusibility at the surface of the light diffusion layer.

In addition, the ionizing radiation curable resin can improve the light transmittance because of its high transmittance. Further it can improve the weather resistance of the optical film because of the hardness of the cured resin thereby making the optical film resistant to scratching and easy to handle.

The photopolymerizing prepolymers included in the ionizing radiation curable paint are incorporated in their structure with a functional group which is radical polymerized or cation polymerized by ionization radiation. The radical polymerized prepolymers are preferable because their hardening speed is high and enables to design the resin freely.

Usable photopolymerizing prepolymers include acrylic prepolymers with acryoyl group such as urethane acrylate, epoxy acrylate, melamine acrylate, polyester acrylate, and the like.

Usable photo polymerizing monomers include single functional acrylic monomers such as 2-ethylhexyl acrylate, 2-hydroxyethyl acrylate, 2-hydroxypropyl acrylate, butoxypropyl acrylate and the like, two functional acrylic monomers such as 1,6-hexandiol acrylate, neopentylglycol diacrylate, diethyleneglycol diacrylate, polyethyleneglycol diacrylate, hydroxypivalate neopentylglycol acrylate and the like, and multifunctional acrylic monomers such as dipentaerythritol hexaacrylate trimethylpropane triacrylate, pentaerythritol triacrylate, and the like. These can be used individually or in combinations of two or more.

As a photo polymerization initiator, there can be used a radical polymerization initiator which induces cleavage, a radical polymerization initiator which pulls out hydrogen, or a cation polymerization initiator which generates ions. An initiator is selected from among the foregoing ones as proper for the prepolymer and the monomer. Usable radical photopolymerization initiators include benzoine ether system, ketal system, acetophenone system, tioxanthone system, and the like. Usable cation-type photopolymerization initiators include diazonium salts, diaryl iodonium salts, triaryl sulfonium salts, triaryl pyrilium salts, benzine pyridinium tiocyanate, dialkyl phenancyl sulfonium salts, dialkyl hydroxy phenylphosphonium salts, and the like. These radical type photopolymerization initiators and cation type photopolymerization initiators can be used alone or as a mixture thereof.

The photopolymerization intiator is required for the ultraviolet radiation curable resins but can be omitted for the high-energy electron beam radiation curable resins.

The ionizing radiation curable resin may include intensifiers, pigments, fillers, non-reactive resin, levelling agents and the like as occasion demands, besides the photopolymerizing prepolymer, the photopolymerizing monomer and the photopolymerization initiator.

The ionizing radiation curable resin is included preferably in an amount of not less than 25% by weight of the binder resin of the light diffusion layer, more preferably not less than 50% by weight and most preferably not less than 75% by weight.

As the resin of the light diffusion layer, thermosetting resins such as thermosetting urethane resins consisting of acrylic polyol and isocyanate prepolymer, phenol resins, epoxy resins, unsaturated polyester resins or the like, and thermoplastic resins such as polycarbonates, thermoplastic acrylic resins, ethylene vinyl acetate copolymer resins or the like may be included in addition to the ionizing radiation curable resin. However, the content of the thermosetting resins and the thermoplastic resins is preferably within 75% by weight based on the total resins of the light diffusion layer so that they do not hamper occurrence of "undulation" in the ionizing radiation curable resin.

As the light diffusive agent contained in the light diffusion layer, inorganic pigments such as titanium oxide, barium sulfate, talc, clay, alumina white, calcium carbonate, silica or the like and synthetic resin beads such as polymethyl methacrylate (PMMA) beads, silicone beads, styrene beads or the like can be used alone or in any combination thereof.

The particle size of the light diffusive agent, which is determined properly relative to the thickness of the light diffusion layer, may be an average particle size of 1 μm–30 μm and preferably has a narrow distribution. According to the present invention, since the light diffusive agent increases the light diffusibility by at least the part of the particles thereof protruding from the surface of the light diffusion layer, the average particle size should be in such a range that part of the particles can protrude from the surface of the light diffusion layer. In this situation, the light diffusibility can be improved even with a small amount of the light diffusive agent, whereby the transparency of the light diffusion layer can be improved. On the other hand, when the light diffusive agent is embedded within the light diffusion layer because of its small particle size, the effect of the light diffusive agent causing "undulation" at the surface of the ionizing radiation curable resin can not be obtained. When the particle sizes distributed over a wide range and the light diffusive agent contains many particles which are embedded in the light diffusion layer, the desired effect can not be obtained without use of a large amount of the agent. Accordingly, particles of even sizes are preferable.

As mentioned above, according to the present invention, the content of the light diffusive agent can be remarkably reduced relative to that of pigments added to the conventional light diffusion layer (generally 150% by weight based on 100% by weight of the resin), since the light diffusion effect of "undulation" of the resin caused by the light diffusive agent particles can be obtained in addition to the matting effect of the particles. Specifically, the content can be 100% by weight or less, preferably 50% by weight or less, more preferably 20% by weight or less. However, the content should be not less than 0.1% by weight, preferably not less than 0.5% by weight, more preferably 1.0% by weight in order to obtain the desired effect. In this range of the content, high transparency and excellent light diffusion effect can be obtained. Specifically, an optical film having a distinctness of image of 30 or less according to the transmission method of JIS K7105 (slit width 2 mm) and a total light transmittance of not less than 90% can be obtained.

Figure 2:
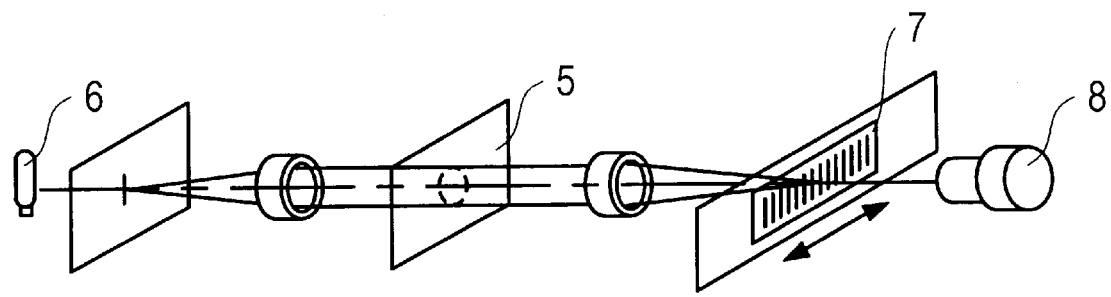
FIG. 2 is a schematic view of an apparatus for measuring the distinctness of image of the optical film according to the present invention.
Figure 3A:
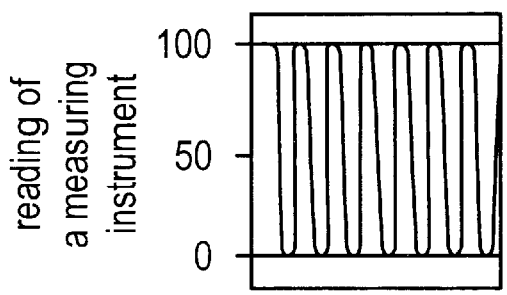
FIG. 3 is an explanatory view of a method for calculating the distinctness of image measured by the apparatus of FIG. 2.
Figure 3B:
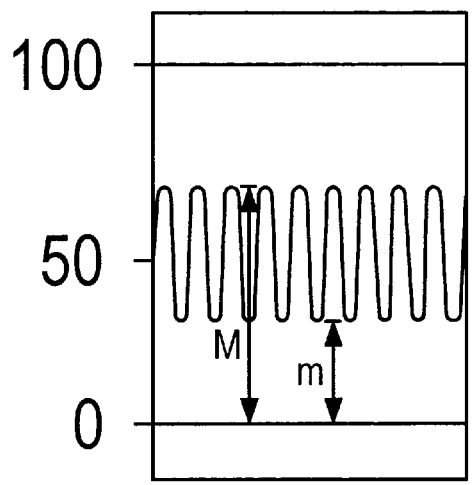
Figure 4:
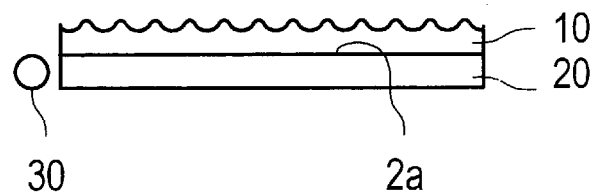
FIG. 4 is a schematic view of a light diffusion sheet to which the optical film of the present invention or the conventional optical film is applied.

The measure employed for the light diffusibility in the present invention (distinctness of image according to JIS K7105) is detected using a clarity meter as shown in FIG. 2, by projecting a light beam from the light source 6 perpendicularly to a 50×50 mm sample 5 and detecting the light transmitted through the sample and an optical comb (slit width 0.125 mm, 0.5 mm, 1.0 mm, 2.0 mm) moving in the direction of the arrow in the drawing. When no sample is present, 100% of the source light is transmitted (received by the light receptor 8) when a slit part of the light comb passes. When a non-slit part of the light comb passes, 100% of the light is cut by the non-slit part and 0% of the light is transmitted. Accordingly, the wave form of the received light by the receptor 8 becomes as shown in FIG. 3(a). On the other hand, when the sample is present, less than 100% of the light is transmitted due to the light diffusibility of the sample even when a slit part passes. Therefore, the maximum wave height M is M<100%. And more than 0% of the light is transmitted even when a non-slit part passes and the minimum wave height m is m>0%. The distinctness of image C is calculated by the following formula using M and m:

$$C=\{(M-m)/(M+m)\}\times 100$$

The light diffusion layer of the present invention is formed by applying an ionizing radiation curable paint including the above-mentioned photopolymerizing prepolymer, the photopolymerizing monomer, the photopolymerization initiator, necessary additives, a solvent and a light diffusive agent dispersed therein to the substrate and projecting the electron beam or ultraviolet beam thereon. When the electron beam is used, an electron beam accelerator of scanning type or curtain type may be employed. An electron beam with a wave length of not more than 100 nm is projected with an accelerating voltage of 1000 keV, preferably 100 to 300 keV. When the ultraviolet beam is used, a super high pressure mercury lamp, a high pressure mercury lamp, a low pressure mercury lamp, a carbon arc, a xenon arc or metalhalide lamp may be employed. The ultraviolet beam has an energy of 71–285 kcal/mol and a wave length in the range of 100–400 nm, preferably 200–400 nm.

The thickness of the light diffusion layer depends on the light diffusive agent. The thickness of the binder part is preferably thinner than the particle size of the light diffusive agent and may be 1–30 μm.

In the optical film of the present invention, the light diffusion layer(s) may be formed on one side or both sides of the substrate. Further, an anti-static layer may be coated on the surface of the substrate formed with the light diffusion layer and/or the opposite surface.

The optical film having the above configuration can be utilized as a light diffusion sheet of a surface light source apparatus, a cover film used in an exposure apparatus for manufacturing a printed circuit board, an overlay film used for color separation by a scanner in a photomechanical process or a protective film for a photographic paper.

EXAMPLES

The examples of the present invention will be explained hereinafter with reference to the drawings.

Example 1

A coating solution for a light diffusion layer having the following composition was applied to one side of a polyester film having a thickness of 100 μm (a processed film for easy adhesion, DIAFOIL 0300E: Diafoil-Hoechst) to obtain a layer with a thickness of 1.9 μm, 2.6 μm or 3.4 μm. An ultraviolet beam was projected onto the layer using a high pressure mercury lamp for one or two seconds to obtain an optical film having a light diffusion layer. Composition of the coating solution for the light diffusion layer:

| | |
|---|---|
| UV curable acrylic resin (solid content 80%, UniDic 17-806 Dainippon Ink & Chemicals Inc.) | 100 parts by weight |
| Photopolymerization initiator (Irgacure651: Ciba Geigy Ltd.) | 1 part by weight |
| Propylene glycol monomethylether | 200 parts by weight |
| Light diffusive agent (average particle size 5 μm) (PMMA beads, MX-500KS: Soken Chemical Co., Ltd.) | 1.6 parts by weight |

The distinctness of image (according to the transmission method of JIS K7105, slit width 2.0 mm) of each of three samples having the light diffusion layers of different thickness on one side was measured. The total light transmittance of these samples was also measured. The results of the distinctness of image are shown in Table 1 and the results of the total light transmittance are shown in Table 2.

Example 2

An optical film having a light diffusion layer on one side was prepared in a same manner as in Example 1 except that the composition of the coating solution for the light diffusion layer was changed as follows. The distinctness of image and the total light transmittance were measured and the results are shown in Tables 1 and 2, respectively.
Composition of the coating solution for the light diffusion layer:

| | |
|---|---|
| Thermoplastic acrylic resin (solid content 40%, AcryDic A-195 (Dainippon Ink & Chemicals Inc.) | 50 parts by weight |
| UV curable acrylic resin (solid content 80%, UniDic17-813 (Dainippon Ink & Chemicals Inc.) | 75 parts by weight |
| Photopolymerization initiator (Irgacure651: Ciba Geigy Ltd.) | 1 parts by weight |
| Propylene glycol monomethylether | 175 parts by weight |
| Light diffusive agent (average particle size 5 μm) (PMMA beads, MX-500KS: Soken Chemical Co., Ltd.) | 1.6 parts by weight |

Examples 3, 4 and Comparative Example 1

Optical films each of which had a light diffusion layer on one side were prepared in a same manner as in Example 1 except that the ratio of the thermoplastic acrylic resin and the UV curable acrylic resin was changed as shown in Table 1. The distinctness of image and the total light transmittance were measured and the results are shown in Tables 1 and 2, respectively. As a control, the distinctness of image of a sample made by applying the thermoplastic acrylic resin including no light diffusive agent to the same film as that of Examples was measured and the result is also shown.

TABLE 1

| | resin | thickness | | |
|---|---|---|---|---|
| | UV/TP | 1.9 μm | 2.6 μm | 3.4 μm |
| Example 1 | 100/0 | 27.2 | 28.8 | 44.4 |
| Example 2 | 75/25 | 52.8 | 40.3 | 51.6 |
| Example 3 | 50/50 | 82.1 | 80.7 | 80.5 |
| Example 4 | 25/75 | 84.9 | 90.0 | 92.7 |
| Comparative Example 1 | 0/100 | 91.3 | 95.0 | 94.8 |
| Control | 0/100 | 98.9 | 99.1 | 98.4 |

In Tables 1 and 2, UV represents the ultraviolet curable acrylic resin and TP represents the thermoplastic acrylic resin.

As can be seen from Table 1, it was found that when the ultraviolet radiation curable acrylic resin was used as the resin of the light diffusion layer (Examples 1–4), the distinctness of image decreased and the light diffusibility increased as the content of the UV radiation curable acrylic resin increased. Especially, when the content of the UV radiation curable acrylic resin exceeded 50% by weight, the light diffusibility was remarkably improved. On the other hand, when the thermoplastic resin was used alone as the resin of the light diffusion layer (Comparative Example 1), the distinctness of image changed only slightly as compared with the control, which had no light diffusive agent included in the resin.

When the UV radiation curable acrylic resin was used in an amount of 100% by weight, the thinner the thickness of the light diffusion layer (resin layer) was, namely, the larger the particle size of the light diffusive agent relative to the thickness of the layer was, the smaller the value of the distinctness of image was. This is considered to be because the light diffusion effect of "undulation" emerges remarkably as a greater portion of the light diffusive agent protrudes from the light diffusion layer.

When measurements were conducted changing the slit width of the clarity meter of FIG. 2 from 2.0 mm to 1.0 mm, 0.5 mm and 0.125 mm, the value of the distinctness of image became smaller as the slit width became smaller. As in measurement with a slit width of 2.0 mm, however, the value became smaller as the content of the UV radiation curable acrylic resin increased. Further, when the UV radiation curable acrylic resin was used in an amount of 100% by weight, the thinner the thickness of the light diffusion layer (resin layer) was, the smaller the value was.

TABLE 2

| | resin | thickness | | |
|---|---|---|---|---|
| | UV/TP | 1.9 μm | 2.6 μm | 3.4 μm |
| Example 1 | 100/0 | 92.2 | 92.3 | 93.4 |
| Example 2 | 75/25 | 93.3 | 92.8 | 93.4 |
| Example 3 | 50/50 | 93.7 | 93.7 | 93.6 |
| Example 4 | 25/75 | 94.3 | 94.4 | 94.4 |
| Comparative Example 2 | 0/100 | 94.6 | 94.5 | 94.4 |
| Control | 0/100 | 93.7 | 93.6 | 93.5 |

As can be seen from Table 2, a high transmittance was observed in all of the samples, which contained very small amount of the light diffusive agent.

Examples 5 and 6

Optical films each of which had a light diffusion layer on one side were prepared in the same manner as in Example 1 except that light diffusive agents of different sizes (MX-3000:3 μm, MX-1000KS:10 μm) were used. The distinctness of image and the total light transmittance were measured and the results of the distinctness of image are shown in Table 3. All of the samples showed a high total light transmittance of not less than 92%.

TABLE 3

| | light diffusive agent | thickness | | |
|---|---|---|---|---|
| | | 1.9 μm | 2.6 μm | 3.4 μm |
| Example 1 | PMMA (5 μm) | 27.2 | 28.8 | 44.4 |
| Example 5 | PMMA (3 μm) | 40.0 | 87.0 | 92.0 |
| Example 6 | PMMA (10 μm) | 42.7 | 33.4 | 27.5 |
| Example 7 | silicone (4.5 μm) | 32.1 | 33.1 | 61.4 |
| Example 8 | silica (4.5 μm) | 43.7 | 46.1 | 54.8 |
| Example 9 | styrene (5 μm) | 70.1 | 55.5 | 44.7 |

As can be seen from Table 3, when the average particle size was sufficiently larger than the thickness of the resin layer (Example 5: thickness of the layer 1.9 μm, Example 6), a high diffusion effect was obtained regardless the thickness of the layer, whereas when the average particle size was approximately the same as the thickness of the layer, the distinctness of image was high and the light diffusion effect was insufficient.

Examples 7–9

Optical films each of which had a light diffusion layer on one side were prepared in the same manner as in Example 1 except that other kinds of the light diffusive agents, i.e., silicone beads (Tospearl 145: average particle size 4.5 μm) (Example 7), irregular form silica (Siloid 65: average particle size 4.5 μm ) (Example 8) and styrene beads (SBX-6: average particle size 6 μm) were used. The distinctness of image and the total light transmittance were measured. All of the samples showed a high transmittance of not less than 92%.

The distinctness of image, as shown in Table 3, was small in all of Examples 7–9 and it was ascertained that the light diffusibility was improved according to the present invention. The phenomenon of the light diffusion effect becoming higher as the thickness decreased was observed in Examples 7 and 8 similarly to Example 1. On the other hand, the distinctness of image increased as the thickness became thicker in Example 9. This is considered to be because, in Example 9, the styrene beads of larger size were scraped away by the coater when the light diffusion layer was formed by coating or the beads of smaller size were embedded in the resin since the particle size of the styrene beads had a very wide distribution.

Comparative Examples 2–6

Optical films with a light diffusion layer on one side of a substrate were prepared using the same PMMA beads (average size 5 μm) as those of Example 1 and Comparative Example 1 and the same thermoplastic resin (thermoplastic acrylic resin) as that of Comparative Example 1 in the same manner as in Comparative Example 1, except that the content of the light diffusive agent was varied. The distinctness of image of the optical films was measured and the results are shown in Table 4.

TABLE 4

| | content of light diffusive agent (phr) | thickness | | |
|---|---|---|---|---|
| | | 1.9 μm | 2.6 μm | 3.4 μm |
| Control | 0 | 98.9 | 99.1 | 98.4 |
| Comparative Example 2 | 5 | 51.0 | 68.5 | 70.3 |
| Comparative Example 3 | 10 | 41.2 | 53.1 | 52.6 |
| Comparative Example 4 | 15 | 32.2 | 43.2 | 44.8 |
| Comparative Example 5 | 20 | 33.7 | 32.4 | 34.4 |
| Comparative Example 6 | 25 | 28.4 | 28.9 | 29.9 |

As can be seen in Table 4, when the thermoplastic resin was used, approximately 12.5 times more light diffusion agent had to be added than in Example 1 in order to obtain the same light diffusibility.

As is clear from these examples, a high light diffusion effect is obtained by using an ionizing radiation curable resin as the resin of the light diffusion layer in the optical film of the present invention, even though only a small amount of the light diffusive agent is dispersed therein. In addition, high transparency can be obtained since the content of the light diffusive agent is small.

Accordingly, an optical film having both high light transmittance and light diffusibility is obtained. Such an optical film is useful for applications such as the color liquid crystal display, which is required to have excellent brightness, and in combination with another optical material such as a prism lens. Further, the optical film of the present invention has excellent weather resistance and good handling property, since the light diffusion layer, the outermost layer, is made of the ionizing radiation curable resin.

We claim:

1. An optical film comprising a transparent substrate and a light diffusion layer formed on at least one side of the substrate, wherein the light diffusion layer comprises an ionizing radiation cured resin as a binder and a light diffusion agent having an average particle size of 1 μm to 30 μm dispersed in the binder, and at least part of the light diffusion agent protrudes from a surface of the binder.

2. The optical film according to claim 1, wherein the ionizing radiation cured resin is included in an amount of not less than 25% by weight of the binder.

3. A light diffusion sheet comprising a transparent film and a light diffusion layer formed on at least one side of the film, wherein the light diffusion layer comprises an ionizing radiation cured resin as a binder and a light diffusion agent dispersed in the binder, and at least part of the light diffusion agent protrudes from a surface of the binder.

4. The light diffusion sheet according to claim 3, wherein the light diffusion agent has an average particle size of 1 μm to 30 μm.

5. The light diffusion sheet according to claim 3, wherein the ionizing radiation cured resin is included in an amount of not less than 25% by weight of the binder.

* * * * *